United States Patent [19]

Hees et al.

[11] Patent Number: 4,883,565

[45] Date of Patent: Nov. 28, 1989

[54] PROCESS FOR ELECTROPHORETIC WHITE AND COLORED ENAMELLING

[75] Inventors: Bruno Hees, Langenfeld; Hans Hoffmann, Leichlingen, both of Fed. Rep. of Germany

[73] Assignee: Bayer Aktiengesellschaft, Leverkusen, Fed. Rep. of Germany

[21] Appl. No.: 159,909

[22] Filed: Feb. 24, 1988

[30] Foreign Application Priority Data

Mar. 7, 1987 [DE] Fed. Rep. of Germany ....... 3707401

[51] Int. Cl.$^4$ ............................................... B05D 3/02
[52] U.S. Cl. ................................. 204/180.2; 204/181.1
[58] Field of Search ........................... 204/181.1, 180.2

[56] References Cited

U.S. PATENT DOCUMENTS

| | | | |
|---|---|---|---|
| 3,616,394 | 10/1971 | Koepke | 204/181 |
| 3,906,123 | 9/1975 | Carini | 427/309 |
| 4,221,824 | 9/1980 | Leonard | 427/27 |
| 4,486,542 | 12/1984 | Krist et al. | 501/17 |

FOREIGN PATENT DOCUMENTS

| | | |
|---|---|---|
| 0049041 | 4/1982 | European Pat. Off. . |
| 2919130 | 11/1979 | Fed. Rep. of Germany ... 204/181.1 |

OTHER PUBLICATIONS

Chemical Abstracts, vol. 97, 59905e (1982).
Dietzel, Emaillierung, SpringerVerlag, 1981, p. 276.
Kyri, Handbuch fur Bayer Email (Handbook for Bayer Enamel) 1974, Verlag des Vereins deutscher Emailfachleute e.V., Hagen, pp. 161 to 162.
German Industrial Standard (DIN) 51 161.
German Industrial Standard (DIN) 52 324.

*Primary Examiner*—John F. Niebling
*Assistant Examiner*—Isabelle Rodriguez
*Attorney, Agent, or Firm*—Connolly and Hutz

[57] ABSTRACT

An improved method comprises electrophoretic application of enamel to a sheet steel substrate by a two layer/single stoving wherein a first or base enamel layer is applied to the sheet steel and a second white or colored enamel layer is applied to the first layer and the first layer has the following properties:
(a) a coefficient of expansion below $165 \times 10^{-7}/K$ at 0° to 100° C.,
(b) a surface tension higher than 300 mN/m,
(c) a transformation temperature of from 480° to 520° C., preferably from 490° to 510° C., and
(d) a yield value of 15 to 30.

4 Claims, No Drawings

PROCESS FOR ELECTROPHORETIC WHITE AND COLORED ENAMELLING

The present invention relates to an improved process for enamelling in white or colors, in particular light colors, in which a layer of base enamel followed by a layer of white or colored enamel are deposited electrophoretically and the two layers are then stoved together. Preliminary treatment of steel sheet by pickling and/or nickel plating may be omitted.

BACKGROUND OF THE INVENTION

The application of enamel by electrodip enamelling (electrophoresis, the so called ETE process) is known. Production plants of various types of construction, primarily for domestic appliances, have been described in the literature (see Warnke, F. Kaup, Maschinenmarkt 80 (1974), page 4; or H. Hoffman, Mitteilungen des VDEFa 24 (1981), page 107; Warnke, Kaup, Mitteilungen des VDEFa 22 (1974), page 49; Hoffmann, Mitteilungen des VDEFa 26 (1978), page 91, van der Vliet, Mitteilungen des VDEFa 25 (1977), page 49). Electrodip enamelling is generally confined to the application of a single layer as it requires a conductive, metallic base.

Once an enamelling has been stoved, it can no longer be electrophoretically coated with additional layers. In the process of application, the deposited layer solidifies due to electroosmosis so that loosely adhering particles may subsequently be washed off. Under certain conditions (sufficiently firm deposition; suitable adjustment of the products as regards their melting properties and interface reactions) it is even possible to apply an additional layer to this base. If a suitable combination of products is used and both systems deposit well by electrodip coating, this second layer may also be deposited electrophoretically.

In enamelling processes which entail the application of a base layer followed by a top layer of enamel and in which the two layers are stoved together but a process of application other than electrophoresis is used, e.g. powder electrostatic application (PUESTA). It is also known that the base enamels are required to be easily flowing and of low viscosity at the appropriate stoving temperature (W. Joseph; Mitteilungen VDEFa 1981 page 159).

When such types of base enamel are used for electrophoretic application, the process becomes very trouble prone since enamelling faults frequently occur, e.g. surface faults, due to electrolytically produced blisters.

BRIEF DESCRIPTION OF THE INVENTION

It has now surprisingly been found that if certain high viscosity base enamels are used it is possible to obtain not only firm adherence to metal sheets (which have only been degreased without pickling and/or nickel plating) but also flawless enamel surfaces, after the base enamel has been stoved together with a top layer of enamel.

DETAILED DESCRIPTION OF THE INVENTION

The present invention relates to a process for the electrophoretic application of enamel in white or colors, in particular light colors, to sheet steel by a two layered/single stoving process, characterised in that the base enamel used is one which has the following properties:

(a) an initial co-efficient of expansion lower than $165 \times 10^{-7}/K$ at 0° to 100° C., (b) a surface tension higher than 300 mN/m, (c) a transformation temperature of from 480° to 520° C., preferably from 490° to 510° C., and (d) a yield value of 15 to 30.

These properties used for characterising the base enamel are determined as follows: values (a) and (b) are calculated by the method according to Dietzel, Emaillierung, Springer-Verlag, 1981, page 276; value (c) is determined according to DIN 52 324 and (d) is determined according to DIN 51 161 and calculated by a method described in Kyri, Handbuch fur Bayer-Email (Handbook for Bayer Enamel) 1974, Verlag des Vereins deutscher Emailfachleute e.V., Hagen, pages 161 to 162.

Enamel frits with high barium and lithium contents are particularly suitable for the process according to the invention. The frits should preferably be free from fluorine.

The frits suitable for the process according to the invention preferably contain the following components in the given ranges:

| | |
|---|---|
| $SiO_2$ | 44–51(% by weight) |
| $Al_2O_3$ | 1–5 |
| $B_2O_3$ | 11–18 |
| $Na_2O$ | 6–12 |
| $Li_2O$ | 2–6 |
| $BaO$ | 10–20 |
| $ZrO_4$ | 0–10 |
| $CoO$ | 0.7–1.5 |
| $NiO$ | 1–4 |

The compositions used according to the invention are also particularly suitable for electrophoretic application of enamel, providing high "throwing power" (coating of regions which are geometrically difficult with greatly reduced field line density) even after only short deposition times so that it is possible to cover the surface with thin layers of base enamel.

It is therefore possible, by using a thin preliminary layer of base enamel according to the invention, to achieve electrophoretic deposition with high throwing power even of those top enamels for which the known method using sodium aluminate according to GB-PS 12 28 434 is difficult owing to the high initial conductivity of the enamel slip. (The quantities of aluminate required for depositing $Al(OH)_3$ in areas where flow is easy would increase the conductivity to such an extent that deleterious electrolytic side reactions would be liable to occur).

The layer thicknesses of the stoved base enamel may vary within wide limits, from about 30 μm to about 120 μm. Whereas the 2-layer/single stoving processes hitherto known cannot have base layers thicken than about 20 to 40 μm; otherwise surface faults would appear in the top enamel layer. Although a relatively thin layer of about 40 μm to 60 μm is also preferred in the ETE process according to this invention, to ensure that the impact strength of the whole enamelling will have the same high quality as the single layered direct white enamelling nowadays conventionally carried out.

After ETE application of the base enamel, loose particles of enamel adhering as a result of the process of dipping the article in the base enamel slip are rinsed off with water. Two rinsing stations are preferably used for this purpose. In the first station, by far the greater part of these particles which are to be rinsed off is collected and returned by a suitable, known method to the slip in the coating vat. In the second station, the remaining particles are removed by finely dosed spraying with fresh water. This ensures that the top coat enamel slip will not be contaminated with particles of base enamel. The electrophoretically deposited layer of base enamel is so form due to the process employed that no abrasion takes place during the immersion in the slip for the top coat enamel.

Any types of enamel suitable for the ETE process may be used as top coat enamel. These are well known in practice (see e.g. the literature references mentioned above).

Due to the advantageous effect of the base layer on the throwing power of the top layer, some of the restrictions in the choice of enamel necessary for the conventional ETE process are inapplicable here.

The process according to the invention described here is particularly suitable for the use of white enamel, especially of the titanium-boron types, but also for the use of so called "Timails", i.e., white enamel colored to the melt, from which light colored enamellings are obtained. The electrophoretic process is carried out according to the parameters introduced. In the present case, it is advisable to operate with low electrical conductivity values in the region of about 2000 μS/cm. Low conductivity values prevent reactions resulting in electrolytically produced gas bubbles.

The process according to the invention also has the advantage that after the electrophoretically deposited layer of base enamel has been rinsed, a layer of white or coloured enamel may be applied by any known method.

The invention will now be described in more detail with the aid of the following example.

EXAMPLE

Parts of a commercial low carbon steel suitable for enamelling is degreased with an alkaline medium with the assistance of ultrasound, rinsed, activated in an acid solution without the removal of metal, again rinsed and then coated electrophoretically with base enamel in a first coating vat.

The base enamel had a coefficient of expansion of $160 \times 10^{-7}/K$, a surface tension of 305 mN/m, a transformation temperature of 505° C. and a yield value of 22.

This base enamel corresponds to the following oxidic composition in % by weight:

| | |
|---|---|
| $SiO_2$ | 49.2 |
| $Al_2O_3$ | 1.1 |
| $B_2O_3$ | 15.6 |
| $Na_2O$ | 7.3 |
| $Li_2O$ | 3.2 |
| BaO | 15.5 |
| $ZrO_2$ | 4.4 |
| CoO | 0.9 |
| NiO | 2.8 |

The frit obtained from the melt is ground up in a ball mill with conventional additives such as clay, bentonite, carboxymethyl cellulose, zeolite and water to form a suspension to which further water is added to adjust the specific gravity and sodium aluminate is added so that the required throwing power for the parts to be enamelled will be obtained when anodic, electrophoretic deposition is subsequently carried out for about 50 to 10 seconds at about 10 V per centimeter distance to the cathode.

Rinsing is then carried out in two stations, the parts being sprayed with finely dosed fresh water in the second station after they have been removed from the bath.

White enamelling is subsequently carried out with an enamel having the following composition in % by weight:

| | |
|---|---|
| $SiO_2$ | 38.2 |
| $Al_2O_3$ | 0.3 |
| $B_2O_3$ | 21.8 |
| $Na_2O$ | 7.4 |
| $K_2O$ | 7.6 |
| $Li_2O$ | 0.3 |
| $TiO_2$ | 20.4 |
| MgO | 0.4 |
| $P_2O_5$ | 3.3 |
| F | 2.0 |

Grinding to form a slip, correct adjustment of the slip for the ETE process and coating are carried out in accordance with known parameters. After drying, the two layers are stoved together at 820° C. for 3 minutes. The enamel has an excellent, smooth surface, free from any faults such as pin pricks, black points or the like. According to the test with a falling instrument, adherence is excellent.

What is claimed is:

1. In an improved method for the electrophoretic application of enamel in white or colors to sheet steel by a two layer/single stoving process, the improvement comprises the first of the two layers consisting essentially of an enamel which has the following properties:
   (a) a coefficient of expansion below $165 \times 10^{-7}/K$ at 0° to 100° C.,
   (b) a surface tension higher than 300 mN/m,
   (c) a transformation temperature of from 480° to 520° C.,
   (d) a yield value of 15 to 30 and
   (e) high viscosity.

2. The method according to claim 1 wherein a frit having the following composition as the first layer enamel:

| | |
|---|---|
| $SiO_2$ | 44–51(% by weight) |
| $Al_2O_3$ | 1–5 |
| $B_2O_3$ | 11–18 |
| $Na_2O$ | 6–12 |
| $Li_2O$ | 2–6 |
| BaO | 10–20 |
| $ZrO_4$ | 0–10 |
| CoO | 0.7–1.5 |
| NiO | 1–4 |

3. The method according to claim 1 wherein the first layer enamel is applied in a layer thickness of from 40 to 60 μm.

4. The method according to claim 1 wherein the second layer is a white or colored enamel which is applied to the first layer enamel after said first layer is rinsed with water.

* * * * *